United States Patent
Brown

(10) Patent No.: US 9,043,816 B2
(45) Date of Patent: *May 26, 2015

(54) HANDLING DYNAMICALLY LINKED FUNCTION CALLS WITH RESPECT TO PROGRAM CODE CONVERSION

(71) Applicant: International Business Machines Corporation, Armonk, NY (US)

(72) Inventor: Alexander B. Brown, Broomhill (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,120

(22) Filed: Jun. 18, 2013

(65) Prior Publication Data

US 2014/0007142 A1     Jan. 2, 2014

Related U.S. Application Data

(63) Continuation of application No. 11/906,531, filed on Oct. 2, 2007, now Pat. No. 8,468,552.

(60) Provisional application No. 60/854,054, filed on Oct. 24, 2006.

(30) Foreign Application Priority Data

Oct. 2, 2006 (GB) .................................. 0619389.0

(51) Int. Cl.
*G06F 9/445* (2006.01)
*G06F 9/455* (2006.01)

(52) U.S. Cl.
CPC ........ *G06F 9/44521* (2013.01); *G06F 9/45516* (2013.01)

(58) Field of Classification Search
CPC ............ G06F 9/44521; G06F 9/45516; G06F 12/109; G06F 8/54
See application file for complete search history.

(56) References Cited

U.S. PATENT DOCUMENTS 5,991,871 A * 11/1999 Zucker .......................... 712/233
6,047,362 A     4/2000 Zucker
(Continued)

FOREIGN PATENT DOCUMENTS

EP     0860774 A2    8/1998
WO     WO0022521 A1  4/2000
(Continued)

OTHER PUBLICATIONS

International Search Report issued for PCT/GB2007/050600, dated Jan. 24, 2008.

(Continued)

*Primary Examiner* — Tuan Dao
(74) *Attorney, Agent, or Firm* — Thomas E. Tyson; Gregory K. Goshorn; Greg Goshorn, P.C.

(57) ABSTRACT

A technique is provided for handling dynamically linked subject function calls arranged pass subject control flow to an intermediate control structure such as a procedure linkage table, then to subject linker code for modifying link information associated with the subject function calls during translation of subject code into target code in a dynamic binary translator. The subject code for execution on a subject processor is received by a translator, and corresponding target code for execution on the target processor is generated. The translator is arranged to build a function linkage table containing an entry giving the location of each function called by the subject code, so that code can be generated by the translator in which subject function calls are associated with code for performing the function, without generating target code corresponding to the intermediate control structure.

24 Claims, 4 Drawing Sheets

(56) References Cited

U.S. PATENT DOCUMENTS

| | | | |
|---|---|---|---|
| 6,091,897 A | 7/2000 | Yates et al. | |
| 6,532,531 B1* | 3/2003 | O'Connor et al. | 712/202 |
| 6,779,187 B1 | 8/2004 | Hammond | |
| 7,401,330 B2 | 7/2008 | Li et al. | |
| 7,412,710 B2 | 8/2008 | Oliva | |
| 2002/0073246 A1 | 6/2002 | Pickett | |
| 2003/0079215 A1* | 4/2003 | Hundt et al. | 717/164 |
| 2003/0088860 A1* | 5/2003 | Wang | 717/153 |
| 2003/0229769 A1 | 12/2003 | Montemayor | |
| 2005/0015758 A1 | 1/2005 | North | |
| 2005/0097298 A1 | 5/2005 | Cohen | |
| 2005/0144606 A1* | 6/2005 | Li et al. | 717/162 |
| 2006/0080682 A1 | 4/2006 | Anwar et al. | |
| 2006/0080683 A1 | 4/2006 | Anwar et al. | |
| 2006/0112374 A1* | 5/2006 | Oliva | 717/127 |
| 2007/0067573 A1* | 3/2007 | Bruening et al. | 711/125 |

FOREIGN PATENT DOCUMENTS

| | | | |
|---|---|---|---|
| WO | WO2005008478 A2 | 1/2005 | |
| WO | WO2005008487 A2 | 1/2005 | |
| WO | WO2006095155 A1 | 9/2006 | |

OTHER PUBLICATIONS

"ELF Application Binary Interface Supplement", IBM, 2001, pp. 1-78.

"An Architectural Framework for Providing Reliability and Security Support", Nakka et al., 2004, pp. 1-10.

"Energy-Efficient and High-Performance Instruction Fetch using a Block-Aware ISA", Zmily et al., 2005, pp. 1-6.

"Chapter 3 Runtime Linker", Sun Microsystems Documentation, http://docs.sun.com/app/docs/doc/817-1984/6mhm7pl1b, printed Jan. 3, 2008.

"Runtime Linker Auditing Interface", Sun Microsystems Documentation, http://docs.sun.com/app/docs/doc/817-1984/6mhm7pl24, printed Jan. 3, 2008.

"Runtime Linker Auditing Interface", Sun Microsystems Documentation, http://docs.sun.com/app/docs/doc/806-0641/6j9vuqujm, printed Jan. 3, 2008.

System V Application Binary Interface: SPARC Processor Supplement, Third Edition, printed from http://www.sparc.com/standards/psABI3d.pdf on Jan. 3, 2008.

UK Search Report from GB0619389.0 dated Dec. 8, 2006.

\* cited by examiner

HANDLING DYNAMICALLY LINKED FUNCTION CALLS WITH RESPECT TO PROGRAM CODE CONVERSION

CROSS-REFERENCES TO RELATED APPLICATIONS

This application claims benefit of the filing dates of 1 GB Patent Application No. 0619389.0 filed Oct. 2, 2006, U.S. Provisional Patent Application No. 60/854,054, filed Oct. 24, 2006, assigned to the assignee of the present application, and herein incorporated by reference, and is a continuation and claims the benefit of the filing date of an application entitled, "Handling Dynamically Linked Function Calls With Respect to Program Code Conversion" Ser. No. 11/906,531, filed Oct. 2, 2007, now U.S. Pat. No. 8,468,552, assigned to the assignee of the present application, and herein incorporated by reference.

FIELD OF THE DISCLOSURE

The claimed subject matter relates generally to the field of computers and computer software, and more particularly to program code conversion methods and apparatus useful, for example, in code translators, emulators and accelerators which convert program code that includes dynamically linked function calls.

BACKGROUND

Across the embedded and non-embedded CPU market, one finds predominant Instruction Set Architectures (ISAs) for which large bodies of software exist that could be "accelerated" for performance, or "translated" to a myriad of capable processors that could present better cost/performance benefits, provided they could transparently access the relevant software. One also finds dominant CPU architectures that are locked in time to their ISA, and cannot evolve in performance or market reach and would benefit from "synthetic CPU" co-architecture.

It is often desired to run program code written for a computer processor of a first type (a "subject" processor) on a processor of a second type (a "target" processor). Here, an emulator or translator is used to perform program code conversion, such that the subject program is able to run on the target processor. PCT application WO00/22521 discloses program code conversion methods and apparatus to facilitate such acceleration, translation and co-architecture capabilities as may be employed in embodiments of the present invention.

A subject program to be translated usually consists of multiple units of subject code, including the subject application and a number of subject libraries, some of which may be proprietary and some of which are provided as part of the subject OS ("system libraries"). As the subject program runs, control flow passes between these different units of subject code as function calls are made to the libraries.

In certain operating systems, for example Solaris from Sun Microsystems Inc., the process of linking function calls to library code which implement the function can be performed at run time, and this procedure is known as dynamic linking. Dynamic linking is performed by dynamic linker code, and involves the use of an intermediate control structure known as a Procedure Linkage Table (PLT).

The PLT is part of a compiled program, and contains an entry including link information for each library function required by the program. When a first call to a library function is encountered in a typical run of the program, control flow jumps to the PLT entry associated with that function. The PLT entry for that function controls the linking process at this stage by invoking the dynamic linker code. The dynamic linker code causes the link information for the function in question to be updated. By updating the link information, the dynamic linker code makes a link from the PLT entry for that function to the library code for implementing the function. The link established in this way typically persists for the remainder of the run of the program.

The dynamic linker code can then pass control flow to the code in the library so that the function is executed.

Subsequent invocations of the function by the program pass control flow as before to the PLT entry. Since the PLT entry has been updated with a link to the library code which implements the function, the PLT now causes control flow to pass directly from there to the library in these subsequent invocations. These subsequent invocations require neither a further update of the PT entry, nor a further invocation of the dynamic linker.

In certain operating systems, the action of creating a link between the PLT entry for a function and the library containing the code for performing the function has the effect of modifying data associated with the PLT, such as a global offset table. The modified global offset table can then be read at run-time by the code in the PLT entry, enabling formation of a link. In certain other operating systems, for example Solaris, the action of creating the link between the PLT entry for a certain function and the library including that function has the alternative effect of modifying the executable code which forms the PLT entry itself.

The use of the PLT as an intermediate control structure as described above, in particular the modification of link information in the PLT by modifying the code comprising the PLT the first time that a function is called, complicates program code conversion for subject code employing a PLT as part of a dynamic linking mechanism.

Code modification at run-time presents problems to dynamic translators, since subject code that is modified may correspond to target code which has already been translated. When such a modification of the subject code occurs, all target code translations of the modified subject code must be identified and discarded as stale. Thus, the translator should be able to identify all target code sequences (i.e., translations) that correspond to particular subject code addresses being modified.

In dynamic translators, finding and deleting the target code which corresponds to a given subject address is difficult and sometimes not even possible. In some situations, optimizations are applied during translation which yield translations that can no longer be exactly correlated to the range of subject addresses that the translations represent. In these situations, if the subject program modifies its own code at certain subject address, the translator has no way to identify which respective translated target code to invalidate. In addition, safe deletion of translated target code in a multi-threaded environment may pose further problems.

Techniques to deal with code modification have been described in PCT application WO05/008487. Although these techniques are useful, the inventors have now identified that the high concentration of code modification which occurs in a PLT at run-time may make the techniques as described in PCT WO05/008487 an inefficient way of dealing with PLT updates. Such techniques can ensure that no invalid translated target code is executed, however, management of control flow when dealing with PLT updates using these techniques has been found to be expensive in terms of processor and memory resources.

Furthermore, the inventors have now identified that the PLT updating method used by the dynamic linker ld.so in the Solaris operating system notably increases the number of partitions needed to execute a typical dynamically linked program, compared to dynamic linkers in some other operating systems.

A method of handling dynamically linked function calls with respect to translation of subject program code is provided, along with a computer apparatus to take advantage of the handling method. Preferred embodiments enable a link to be established from a function call in subject code to code corresponding to the subject code function using a function linkage table, without generating target code corresponding to the intermediate control structure. A computer apparatus including a translator operating to convert subject code to target code can be arranged such that dynamically linked function calls in the subject program are identified, and target code is generated which features a direct association with code for performing the function, that association based on information gathered by the translator into a function linkage table.

Preferred embodiments of the technique for handling dynamically linked function calls enable dynamically linked function calls in subject code to be conveniently associated with code for performing the function. Preferred embodiments may reduce processing and memory overheads associated with techniques such as those known from PCT WO05/008487 for dealing with code modification.

The present invention can thereby improve performance of a computer system, e.g. while undertaking program code conversion.

SUMMARY

According to the present invention there is provided an apparatus and method as set forth in the appended claims. Preferred features of the invention will be apparent from the dependent claims, and the description which follows.

in one aspect there is provided a computer apparatus comprising: a target processor; and a translator arranged to receive subject code for execution on a subject processor and generate target code for execution on the target processor; wherein the translator is arranged: (a) to receive subject code comprising one or more dynamically linked subject function calls arranged to pass subject control flow to subject linker code via an intermediate control structure in the subject code, to thereby associate the dynamically linked subject function calls with subject code for performing the functions; and (b) to identify such dynamically linked function calls in the received subject code, and to associate such dynamically linked function calls with code for performing the corresponding function, without generating target code corresponding to the intermediate control structure.

The translator apparatus may be arranged to identify dynamically linked subject function calls in the received subject code and to collect linking information on the dynamically linked function calls on a first translation of the received subject code, and to use the collected information in subsequent translations of the received subject code. The computer apparatus may be arranged such that the translator apparatus uses the collected information in subsequent translations to transfer control flow from the identified function call to the code for performing the corresponding function.

The computer apparatus may be arranged such that when the translator receives subject code comprising one or more dynamically linked subject function calls arranged to pass subject control flow to subject linker code via a Procedure Linkage Table (PLT) of the subject code, these are identified in the received subject code, by the translator, and are associated with code for performing the corresponding function, without generating target code corresponding to the PLT.

In another aspect there is provided a method of program code conversion performed on a target processor, comprising the steps of: receiving subject code for execution on a subject processor, wherein the received subject code comprises one or more dynamically linked subject function calls arranged to pass subject control flow to subject linker code via an intermediate control structure in the subject code, to thereby associate the dynamically linked subject function calls with subject code for performing the functions; identifying such dynamically linked function calls in the received subject code; and generating target code for execution on the target processor in which such dynamically linked function calls are associated with code for performing the corresponding function, without generating target code corresponding to the intermediate control structure.

In still another aspect there is provided a computer-readable medium having recorded thereon instructions implementable by a computer to perform a method of program code conversion performed on a target processor, comprising the steps of: receiving subject code for execution on a subject processor, wherein the received subject code comprises one or more dynamically linked subject function calls arranged to pass subject control flow to subject linker code via an intermediate control structure in the subject code, to thereby associate the dynamically linked subject function calls with subject code for performing the functions; identifying such dynamically linked function calls in the received subject code; and generating target code for execution on the target processor in which such dynamically linked function calls are associated with code for performing the corresponding function, without generating target code corresponding to the intermediate control structure.

In still another aspect there is provided a translator apparatus arranged to receive subject code for execution on a subject processor and generate target code for execution on the target processor; wherein the translator is arranged: to receive subject code for execution on a subject processor, wherein the received subject code comprises one or more dynamically linked subject function calls arranged to pass subject control flow to subject linker code via an intermediate control structure in the subject code, to thereby associate the dynamically linked subject function calls with subject code for performing the functions; to identify such dynamically linked function calls in the received subject code; and to generate target code for execution on the target processor in which such dynamically linked function calls are associated with code for performing the corresponding function, without generating target code corresponding to the intermediate control structure.

The above is a summary of various aspects of embodiments of the present invention. It is provided as an introduction to assist those skilled in the art to more rapidly assimilate the detailed discussion of the invention that ensues and does not and is not intended in any way to limit the scope of the claims appended hereto.

BRIEF DESCRIPTION OF THE DRAWINGS

The accompanying drawings, which are incorporated in and constitute a part of the specification, illustrate presently preferred implementations and are described as follows.

DETAILED DESCRIPTION OF THE FIGURES following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

Figure 1:
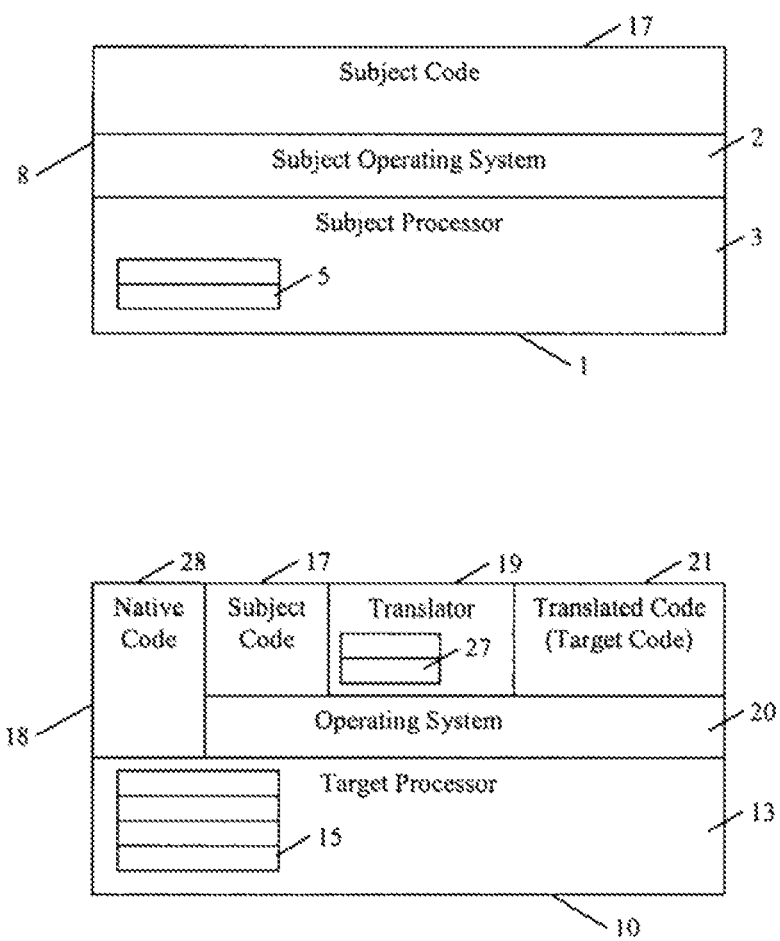
FIG. 1 is a block diagram illustrative of apparatus wherein embodiments of the invention find application.

Referring to FIG. 1, a subject program 17 is intended to execute on a subject computing platform 1 having a subject processor 3. However, a target computing platform 10 is instead used to execute the subject program 17, through a translator unit 19 which performs program code conversion. The translator unit 19 performs code conversion from the subject code 17 to target code 21, such that the target code 21 is executable on the target computing platform 10.

As will be familiar to those skilled in the art, the subject processor 3 has a set of subject registers 5. A subject memory 8 holds, inter alia, the subject code 17 and a subject operating system 2. Similarly, the example target computing platform 10 in FIG. 1 comprises a target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

The translator code 19 is suitably a compiled version of source code implementing the translator, and runs in conjunction with the operating system 20 on the target processor 13. It will be appreciated that the structure illustrated in FIG. 1 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 1, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level.

The term "basic block" will be familiar to those skilled in the art. A basic block is a section of code with exactly one entry point and exactly one exit point, which limits the block code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator 19 may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture (i.e., the subject registers 5 of FIG. 1). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator 19.

Figure 2:
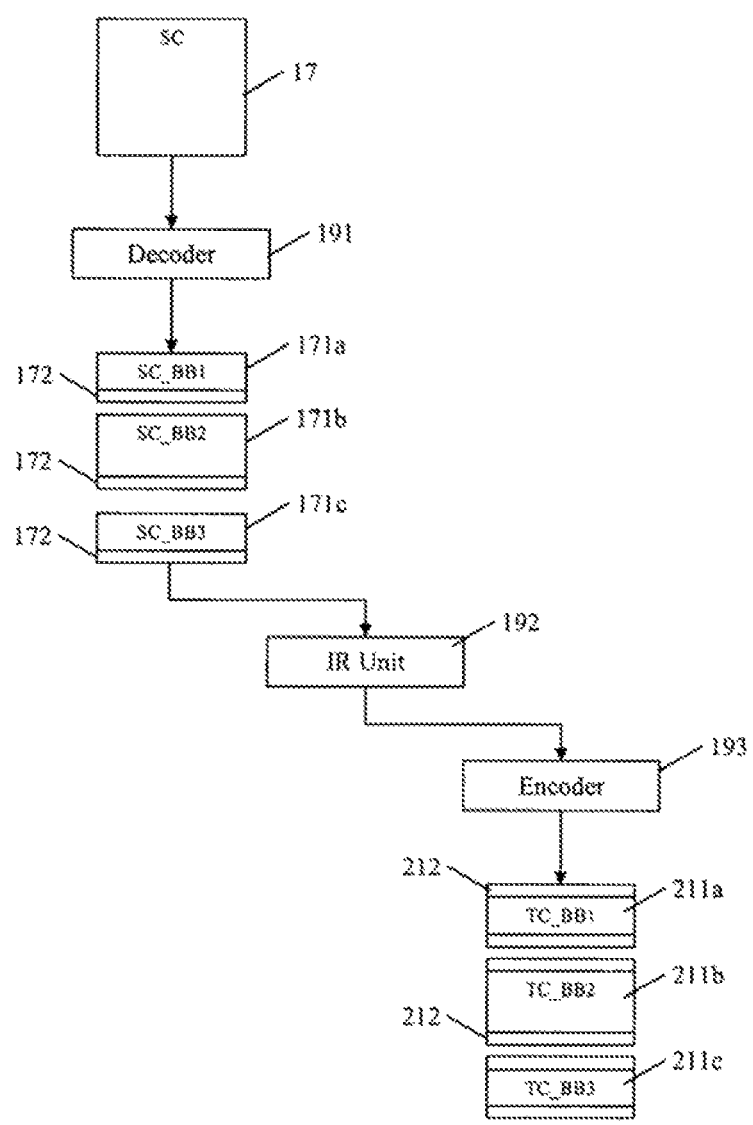
FIG. 2 is a schematic diagram of a translator unit as employed by embodiments of the present invention.

FIG. 2 illustrates the translator 19 in more detail when running on the target computing platform 10. As discussed above, the front end of the translator 19 includes a decoder unit 191 which decodes a currently needed section of the subject program 17 to provide a plurality of subject code blocks 171a, 171b, 171c (which usually each contain one basic block of subject code), and may also provide decoder information 172 in relation to each subject block and the subject instructions contained therein which will assist the later operations of the translator 19. In some embodiments, an IR unit 192 in the core of the translator 19 produces an intermediate representation (IR) from the decoded subject instructions, and optimisations are opportunely performed in relation to the intermediate representation. An encoder 193 as part of the back end of the translator 19 generates (plants) target code 21 executable by the target processor 13. In this simplistic example, three target code blocks 211a-211i are generated to perform work on the target platform 10 equivalent to executing the subject code blocks 171a-171c on the subject platform 1. Also, the encoder 193 may generate header code and/or footer code 212 for some or all of the target code blocks 211a-211c which performs functions such as setting the environment in which the target block will operate and passing control back to the translator 19 where appropriate.

Figure 3:
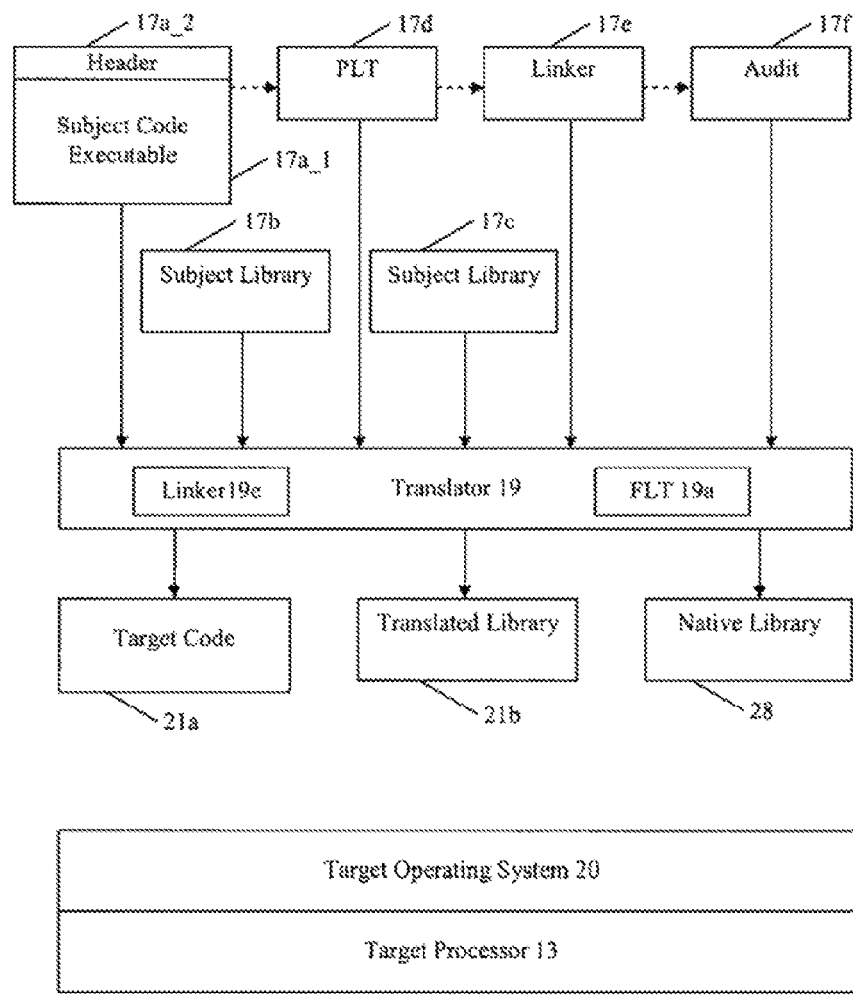
FIG. 3 is a block diagram illustrative of an apparatus as employed by embodiments of the invention.

FIG. 3 is a more detailed schematic diagram illustrating an apparatus as employed by embodiments of the present invention. In the illustrative example of FIG. 3, the translator 19 is arranged to perform a SPARC to x86 translation.

The subject code 17 comprises a subject executable file 17a which is to be translated into target code 21a. The subject executable 17a may in turn refer to and make use of functions from a number of subject libraries including proprietary libraries and/or system libraries. Two example libraries 17b, 17c are illustrated.

The subject executable 17a is structured according to an executable file format compatible with the subject processor's operating system. Typically, the subject executable 17a comprises a main body of code 17a_1, and a header 17a_2. The header 17a_2 provides information about the main body of code 17a_1, for example information which is useful in parsing the subject executable and information used for performing dynamic linking when the subject executable 17a is run. Although referred to as a "header", the header 17a_2 may wholly or in part reside away from the start of the subject executable 17a.

In the illustrative example of FIG. 3, the subject executable 17a is structured according to the Executable and Linking Format (ELF). The ELF standard is widely used, and the headers 17a_1 of files of this structure contain information on a Procedure Linkage Table 17d (PLT) associated with the subject executable 17a.

When the subject code 17 is running natively on a subject processor 3, calls in the subject executable file 17a to function libraries 17b, 17c are administered by use of the PLT 17d (PLT), and by subject linker code 17e. In this sense, the subject linker code 17e uses the PLT 17d as an intermediate control structure for dealing with dynamically linked functions in the subject executable file 17a.

Subject function calls are arranged to pass control flow to the subject linker code 17e, which is arranged to modify link information in the PLT 17d associated with the subject function calls to thereby link the subject function calls to subject code for performing the functions.

The procedure by which the PLT 17d is used to link a function call in the subject executable file 17a to a function in subject library 17b when the subject code is running natively on a subject processor is described in the introductory portion of this document, and will be known to the person skilled in the art. More information on the use of runtime linking and the PLT in the Solaris operating system is available at: http://docs.sun.com/app/docs/doc/817-1984/6mhm7pl1b.

Also shown in FIG. 3 is subject code for performing link auditing functions, referred to hereinafter as the link auditor 17f. In the Solaris operating system, the link auditor 17f can monitor linker activity by using code compatible with a link audit interface provided by the operating system. The Solaris link audit interface is known as rtld-audit. More information about rtld-audit is available at: http://docs.sun.com/app/docs/doc/817-1984/6mhm7pl24.

If a link auditor conforming to the rtld-audit interface is loaded as part of an executable, the audit routines contained therein are automatically called by the subject linker code 17e at various stages of linker execution. Using the rtld-audit interface enables the link auditor to access to information regarding loaded objects such as the subject code executable 17a, and subject libraries 17b and 17c. Furthermore, the link auditor can access to information regarding associations that are made between such loaded objects, as well as other information relating to transfer of information between applications and libraries. More information is available at: http://docs.sun.com/app/docs/doc/806-0641/6j9vuqujm.

The link auditor can also monitor individual invocations of function calls and their return values during PLT updates performed by the linker.

If being executed natively on the subject processor 3, a call to function in subject library 17b would pass subject control flow to the PLT 174, and then to the subject linker code 17e. The subject linker code 17e would modify link information resident in the PLT 17d associated with the subject function call to thereby link subsequent calls to the PLT entry for a subject function to the relevant subject code for performing the function resident in subject library function 17b.

Function Linkage Table Generation—Using Link Auditor to Monitor Linker Activity

Before generating target code 21 corresponding to the subject executable 17a, the translator 19 collects information on the subject executable 17a by reference to the header 17a_1 of the subject executable 17a and/or by performing one or more scans of the subject executable 17a. The translator 19 uses the collected information to identify the PLT 17d associated with the subject executable 17a.

After the translator 19 has collected information on the subject executable 17a, the translator 19 works through the subject executable 17a for the first time, and in doing so establishes links between dynamically linked function calls in the subject executable 17a and code for performing the corresponding functions.

As the translator 19 works through the subject executable 17a, each dynamically linked function call encountered in the subject code 17a is checked against a function linkage table (FLT) 19a held in the translator 19. If as expected on the first translation of the subject code 17a, function calls are encountered for which there is no entry in the FLT 19a, the control flow of the subject code 17 is followed to the linker code 17e via the PLT 17d. The translator 19 can then proceed to work through the code for performing the function.

The linker 17e passes linking information to the link auditor 17f, and the translator 19 uses this information to add an entry to the FLT 19a. In particular, the translator 19 receives and stores the identifier of each function called by the subject executable 17a, and the location of that function. Each entry in the FLT 19a comprises a function identifier and the location of the corresponding function. However, the translator 19 does not generate target code comprising a translation of the update of the PLT region 17*d* by the linker code 17*e*.

In the example embodiment described above, the translator 19 uses a link auditor 17*f* compatible with the rtld-audit interface in building the FLT 19*a*. However, other example embodiments may employ different techniques to identify linker activity and thereby populate and maintain the FLT 19*a*.

Function Linkage Table Generation-Direct Monitoring of Linker Activity

In further exemplary embodiments, an alternative mechanism can be used to detect modifications to the PLT 17*d*, and to ascertain the location of the code for performing a dynamically linked subject function called by the subject executable 17*a*. In such embodiments, the translator 19 may recognise a PLT from knowledge of the file format of the executable. Using the information about the location of the PLT region, the translator can identify the operation of the linker as it modifies the PLT by detecting a characteristic sequence of subject code instructions. In the example of translating from SPARC, a characteristic sequence of subject instruction cache flush instructions which affect the recognised PLT region may be detected.

Subject code instruction cache flush instructions are performed when the flow of control in the subject code passes into the linker from the PLT, and when the linker modifies that PLT entry in response. Once the appropriate sequence of flushes has occurred, the translator can read the modified PLT region to determine the address of the code for performing the function called by the subject executable. This address can be used to create an association between the dynamically linked function call in the subject executable and the code for performing the function. The translator does not, however, generate target code corresponding to modification of the intermediate control structure provided by the PLT region. As before, the translator can store the function identity and the address of code for carrying out the function in a FLT.

Using the Information in the Function Linkage Table

In typical applications, it is very likely that the translator 19 will encounter subject code 17 containing one or more dynamically linked function calls for which an FLT entry has been made. For example, the translator may be required to re-translate a previously translated portion of subject code. In these circumstances, function calls are encountered for which a corresponding entry exists in the FTL 19*a*. The translator 19 can then use the information previously recorded in the FLT 19*a* to establish an association between the function call in the subject code and the corresponding code for performing the function. This association may conveniently be in the form of a direct link.

Re-translations of a particular function call bypass both the PLT 17*d* and the linker code 17*e*, and enable the translator 19 efficiently to associate the dynamically linked function call to the relevant code for performing the function. That is, associating the function call in the subject code with the corresponding code for performing the function using the FLT does not involve generating target code corresponding to the intermediate control structure in the subject code. The subject linker code 17*e* for modifying the link information resident in the PLT 17*d* relating to the function call in question is also not translated. During re-translations the subject linker code 17*e* is bypassed in the subject code, and therefore not visited by the translator 19.

As described above, as the translator 19 works through a portion of subject code for the first time, it populates the FLT 19*a*. Subsequent re-translations will be more efficient than the first translation, as the translator 19 avoids the linker code 17*e* and uses the information in the FLT 19*a*. Re-translations do not require the translator to do work to populate the FLT 19*a*.

Indirect Function Calls

Some dynamically linked function calls encountered by a translator will be indirect function calls. An indirect function call is a call which depends on the value of a variable. The value of the variable determines the location called, and may change. Therefore the translator can only determine the location of the code for performing the required function at the point at which it executes target code corresponding the indirect function call.

As described above in relation to FIG. 1, when the translator encounters a function call, it establishes a new basic block. The translator can check the subject address referenced by the indirect function call against the information stored in the FLT. If the address is already present in the FLT the translator must have previously encountered a call to the function to which the indirect function call is currently referencing. The translator can then treat the previously established basic block relating to that function call as performing the same functionality as the newly established basic block. This can further reduce the amount of work the translator is required to perform by enabling the translator to use the previously established basic block in place of the newly established basic block.

Associating Dynamically Linked Function Calls in the Subject Code with Code Other than Subject Code In the embodiments described above, the locations maintained in the FLT are conveniently addresses of the subject code instructions for performing the corresponding function. However, in other embodiments of the present invention FLT entries may be chosen by the translator 19 such that the addresses in the FLT point to other code for performing the corresponding function. By using the FLT in this way, the translator may reduce its workload. The FLT entries may be chosen by the translator to point to any one of:

previously translated target code;

functions in a native library 28 of the target operating system 20;

portions of optimised IR known to the translator and from which target code can be conveniently generated; or a de-referenced variable which represents, or can be used to generate the location of subject code, or any one of the above.

Use of a de-referenced variable as described above allows the translator to exercise greater control over the association between a function call and the code for performing the corresponding function. This may be desirable if the location of the code for performing a particular function is not fixed for the duration of a current invocation of the subject program.

In an illustrative example, the translator 19 is arranged to perform a SPARC to x86 translation. The SPARC target system library may contain therein routines for performing one or more functions for which the results of performing the function on particular arguments are strictly defined. Such strictly defined functions are known as ABI "dot" functions, and include for example a range of math functions such as .umul, .smul etc. These ABI dot functions are documented at: http://www.sparc.com/standards/psABI3rd.pdf.

Since the operation of ABI dot functions is strictly defined, the translator can treat a function call identified as a call to an ABI dot function as a simple instruction having the same effect as the ABI dot function. This enables the translator to bypass the PLT entirely, for example by establishing a FLT entry and associating the function call directly with a portion of non-subject code for performing the corresponding function. Bypassing the PLT in this way reduces the translator's workload. Furthermore, in this example the translator can avoid the work associated with dealing with the function call at all by adding code having the effect of the relevant ABI dot function in place of the function call itself.

Calls to subject functions having a known correspondence with a native function library can be identified by the translator 19, and the correspondence with native functions exploited to reduce the translator's workload. For example a call to memcpy in subject library 17c, can be associated in the FLT 19a with the location of a native x86 equivalent in the native library 28. This eliminates the cost of translating the subject (SPARC) version of the memcpy function. In addition, the native (x86) version of the memcpy function is adapted to the intricacies of the native hardware, and can achieve the function's desired effect in the most efficient way for that hardware.

Figure 4:
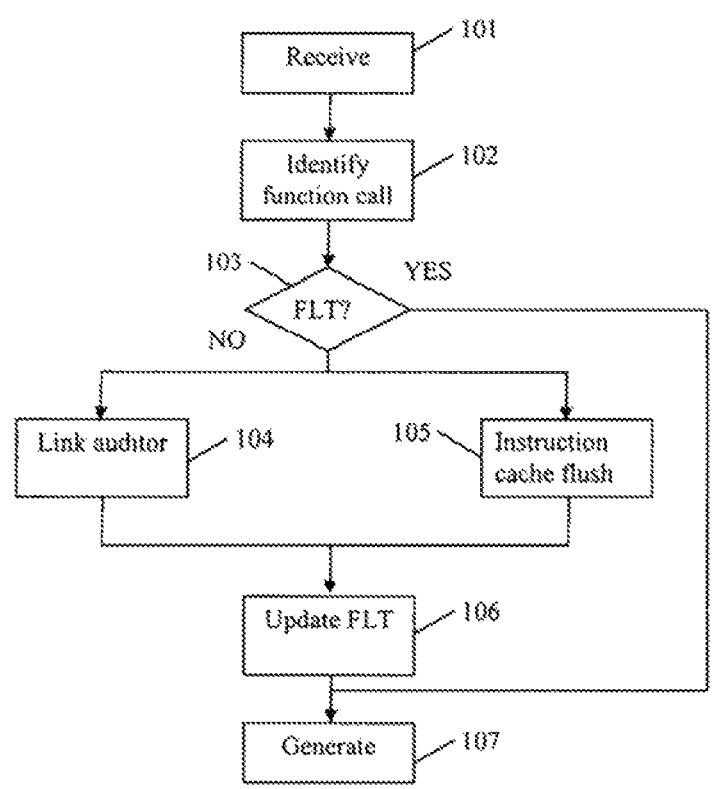
FIG. 4 is a schematic flow diagram illustrating an example function call handling method.

FIG. 4 is a schematic flow diagram illustrating an example embodiment of a method of handling dynamically linked function calls. The subject code is received, and scanned to identify a PLT region (step 101). A dynamically linked function call is identified in the subject code (step 102), which is arranged to pass subject control flow to subject linker code for modifying link information associated with the subject function call in a PLT, thereby to link the subject function call to subject code for performing the function. The FLT is checked for an entry corresponding to the identified function call (step 103), and if the FLT contains a relevant entry the method proceeds to step 107 where target code is generated in which the function call is associated with code for performing the function. The association established at step 107 is based on the function identifier and location as stored in the FLT. The generated target code does not comprise target code corresponding to the intermediate control structure provided by the PLT.

If at step 103 it is determined that the FLT does not contain a relevant entry for the identified function call, the link auditor can operate to obtain the function identifier and location (step 104), and/or the function identifier and location can be obtained by monitoring for subject code instruction cache flushes (step 105). The information obtained at steps 104 and/or 105 is then entered into the FLT (step 106). Thereafter, the step 107 is performed, based on the information obtained at steps 104 and/or 105.

In the example embodiments described in detail above, the subject linker code is present in the body of subject code accessible to the translator. However, in other embodiments the linker functionality for performing linking in the subject code may be provided by the translator using target code written specifically for execution on the target processor, such as the linker code 19e shown in FIG. 3. Furthermore, although the example embodiments have focused on the PLT associated with the subject executable, the subject libraries 17b, 17c will also include intermediate control structures in the form of their own PLT regions. The methods and apparatus described herein can apply equally to these PLT regions, or other identifiable portions of code comprising intermediate control structures and giving rise to corresponding problems.

By using the techniques described herein, the translator 19 need not follow the subject code's flow of control to generate a translation corresponding to the update of indirect linking information in an intermediate control structure such as a PLT or the like, and can therefore avoid the processing and memory costs of translating portions of subject code containing a high concentration of code which is modified at runtime.

Additionally, efficient mechanisms have been described to address circumstances in which the translator does execute subject code containing updates of indirect linking information.

In particular, the inventors have developed methods and units useful in a computer system for performing program code conversion. Such methods and units are particularly useful in connection with a computer system set up as with a run-time translator that provides dynamic binary translation of subject program code into target code.

The present invention also extends to a translator apparatus arranged to perform any of the methods defined herein. Also, the present invention extends to computer-readable storage medium having recorded thereon instructions implementable by a computer to perform any of the methods defined herein.

At least some embodiments of the invention may be constructed solely using dedicated hardware, and terms such as 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

The different features of the apparatus and method of the present invention are described separately in each of the above embodiments. However, it is the full intention of the inventors of the present invention that the separate aspects of each embodiment described herein may be combined with the other embodiments described herein.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

Although a few preferred embodiments have been shown and described, it will be appreciated by those skilled in the art that various changes and modifications might be made without departing from the scope of the invention, as defined in the appended claims. Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any accompanying claims, abstract and drawings), or to any novel one, or any novel combination, of the steps of any method or process so disclosed.

I claim:

1. A computer apparatus comprising:
a target processor; and
a translator arranged to receive subject code for execution on a subject processor and generate target code for execution on the target processor, the translator comprising:
a function linkage table; and
logic for:
detecting a modification to a procedure linkage table associated with a dynamically linked subject function call of the subject, code;
associating the dynamically linked subject function call with code for performing the dynamically linked subject function call; and
adding, in response to the detecting of the modification, an entry to the function linkage table, the entry comprising:
an identifier corresponding to the dynamically linked subject function call; and
a location of the code for performing the dynamically linked subject function call.

2. The computer apparatus of claim 1, wherein the translator apparatus is arranged to identify the dynamically linked subject function call in the subject code and to collect linking information on the dynamically linked function call on a first translation of the subject code, and to use the collected information in subsequent translations of the subject code.

3. The computer apparatus of claim 2, wherein the translator apparatus is arranged to use the collected information in the subsequent translations to transfer control flow from the dynamically linked subject function call in the subject code to the code for performing the dynamically linked subject function call.

4. The computer apparatus of claim 1, wherein the translator is arranged to store information on the dynamically linked subject function calls in a function linkage table accessible to the translator in the form of an identifier for dynamically linked subject function calls, and the location of code for performing the dynamically linked subject function calls in the function linkage table.

5. The computer apparatus of claim 4, wherein the translator is arranged to check the function linkage table for an entry corresponding to the dynamically linked subject function call, and if the function linkage table includes an entry corresponding to the dynamically linked subject function call to associate the dynamically linked subject function call with code for performing the corresponding dynamically linked subject function call using the information stored in the function linkage table.

6. The computer apparatus of claim 2, the translator logic for detecting a modification to the function linkage table composes one of:
logic for monitoring subject linker activity; and
logic for detecting a characteristic subject code instruction sequence in the form of a sequence of subject instruction cache flush events.

7. The computer apparatus of claim 1, wherein the translator establishes a direct link between the dynamically linked subject function call and the code for performing the dynamically linked subject function call.

8. The computer apparatus of claim 4, wherein the translator further comprises logic to store in the function linkage table one or more of:
a location of native code for performing the dynamically linked subject function call;
a location of previously translated target code for performing the dynamically linked subject function call; and
a location of portions of optimised intermediate representation known to the translator and from which target code can be generated for performing the dynamically linked subject function call.

9. The computer apparatus of claim 1, wherein the translator is arranged to identify dynamically linked function calls relating to strictly defined functions, and to replace such dynamically linked function calls relating to strictly defined functions with code for implementing the dynamically linked function calls relating to strictly defined functions.

10. The computer apparatus of claim 4, wherein the translator is arranged to store in the function linkage table a de-referenced variable relating to the location of one of:
subject code for performing the dynamically linked subject function call;
native code for performing dynamically linked subject function call;
previously translated target code for performing the dynamically linked subject function call; and
portions of optimised intermediate representation known to the translator and from which target code can be generated for performing the dynamically linked subject function call.

11. The computer apparatus of claim 1, wherein the translator is arranged to receive subject code comprising one or more dynamically linked subject function calls arranged to pass subject control flow to subject linker code via a Procedure Linkage Table (PLT) of the subject code, to identify such dynamically linked subject function calls in the subject code, and to associate such dynamically linked subject function calls with code for performing a corresponding function, without generating target code corresponding to the PLT.

12. The computer apparatus of claim 1, wherein the translator is arranged to receive subject code comprising one or more dynamically linked subject function calls arranged to pass subject control flow to subject linker code via an area of sell modifying subject code, to identify such dynamically linked subject function calls in the subject code, and to associate such dynamically linked subject function calls with code for performing a corresponding function, without generating target code corresponding to self modifying subject code.

13. A method, comprising:
receiving, at a translator, subject code for execution on a subject processor, wherein the received subject code comprises a dynamically linked subject function call;
detecting a modification to a procedure linkage table associated with the subject code:
associating the dynamically linked subject function call pith code fear performing corresponding functions; and
adding, in response to the detecting of the modification, an entry to a function linkage table associated with the translator, the entry comprising:
an identifier corresponding to the dynamically linked subject function call; and a location of the code for performing the dynamically linked subject function call.

14. The method of claim 13, wherein on a first translation of the subject code, linking information on the dynamically linked subject function call is collected for use in subsequent translations of the subject code.

15. The method of claim 14, wherein in subsequent translations the information collected on a first translation is used to transfer control flow from the dynamically linked subject function call to the code for performing the corresponding functions.

16. The method of claim 13, comprising storing information on the dynamically linked subject function call in a function linkage table and checking the function linkage table for an entry corresponding to the dynamically linked subject function call, and if the function linkage table includes an entry corresponding to the dynamically linked subject function call, associating the dynamically linked subject function call with code for performing a corresponding function using the information stored in the function linkage table.

17. The method of claim 14, wherein linking information is collected by monitoring subject linker activity.

18. The method of claim 14, wherein the step of collecting information on the dynamically linked subject function call comprises detecting a characteristic subject code instruction sequence in a form corresponding to a characteristic sequence of subject instruction cache flush events.

19. The method of claim 13, further comprising establishing a direct link in the target code between the dynamically linked subject function call and code for performing the dynamically linked subject function call.

20. The method of claim 16, further comprising storing in the function linkage table one or more selected from a group consisting of:
   a location of native code for performing the dynamically linked subject function call;
   a location of previously translated target code for performing the dynamically linked subject function call;
   a location of portions of optimised intermediate representation from which target code can be generated for performing the dynamically linked subject function call; and
   a de-referenced variable relating to the location of one of:
      subject code for performing the dynamically linked subject function call;
      native code for performing the dynamically linked subject function call;
      previously translated target code for performing the dynamically linked subject function call;
      portions of optimised intermediate representation known to the translator and from which target code can be generated for performing the dynamically linked subject function call.

21. The method of claim 14, comprising the identifying dynamically linked subject function call relating to strictly defined functions, and replacing the dynamically linked subject function call with code for implementing the dynamically linked subject function call.

22. The method of claim 14, comprising
   receiving the dynamically linked subject function calls arranged to pass subject control flow to subject linker code via a Procedure Linkage Table (PLT) of the subject code;
   identifying such dynamically linked subject function call in the subject code; and
   associating each such dynamically linked subject function call with code for performing a corresponding function, without generating target code corresponding to the PLT.

23. The method of claim 14, further comprising
   receiving the dynamically linked subject function call arranged to pass subject control flow to subject linker code via an area of self modifying subject code;
   identifying the dynamically linked subject function call in the subject code; and
   associating the dynamically linked subject function call with code for performing a corresponding function, without generating target code corresponding to the area of self modifying subject code.

24. A translator apparatus arranged to receive subject code for execution on a subject processor and generate target code for execution on the target processor; comprising:
   a processor;
   a function linkage table;
   a non-transitory computer-readable storage medium, coupled to the processor; and
   logic, stored on the computer-readable storage medium and executed on the processor, to:
      receive subject code for execution on a subject processor, wherein the subject code comprises a dynamically linked subject function call;
      detect a modification to a procedure linkage table associated with a dynamically linked subject function call of the subject code;
      associate the dynamically linked subject function call with subject code for performing a function corresponding to the dynamically linked subject function call; and
      add an entry to the function linkage table, the entry comprising;
         an identifier corresponding to the dynamically linked subject function call; and
         a location of the code for performing the dynamically linked subject function call.

* * * * *